US012803982B2

(12) United States Patent
Jacob

(10) Patent No.: US 12,803,982 B2
(45) Date of Patent: Nov. 17, 2026

(54) METHODS AND SYSTEM FOR INTEGRATED SECURITY SWITCHING

(71) Applicant: ROCKWELL COLLINS INC., Cedar Rapids, IA (US)

(72) Inventor: Josia Mary Jacob, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 18/795,480

(22) Filed: Aug. 6, 2024

(65) Prior Publication Data

US 2026/0046287 A1 Feb. 12, 2026

(51) Int. Cl.
*H04L 9/40* (2022.01)

(52) U.S. Cl.
CPC ............ *H04L 63/10* (2013.01); *H04L 63/062* (2013.01)

(58) Field of Classification Search
CPC ................................ H04L 63/10; H04L 41/28
See application file for complete search history.

(56) References Cited

U.S. PATENT DOCUMENTS 6,934,860 B1 8/2005 Goldstein
2016/0019733 A1* 1/2016 Robinton .............. H04W 4/023 340/5.61
2016/0057129 A1 2/2016 Bailey, Jr.
2021/0256166 A1 8/2021 Conti
2023/0108228 A1* 4/2023 Joshi ................... G06F 3/04886 726/17

* cited by examiner

*Primary Examiner* — Esther B. Henderson
(74) *Attorney, Agent, or Firm* — Millen, White, Zelano & Branigan P.C.; William F. Nixon

(57) ABSTRACT

A secure system is coupled to at least two devices or entry points for access to the secure system. A key sequence is defined for access to the secure system. The key sequence corresponds to the devices coupled to the secure system. A sequence of steps is performed involving the devices. Each step includes capturing a key from a device of the devices and receiving the key at the secure system. A sequence order is determined for the sequence of steps based on the captured keys. The secure system determines whether to allow access based on whether the sequence order corresponds to the key sequence.

20 Claims, 4 Drawing Sheets

METHODS AND SYSTEM FOR INTEGRATED SECURITY SWITCHING

FIELD OF THE INVENTION

The present application relates to a systematic method to provide security authentication using switching before accessing a secure system.

DESCRIPTION OF THE RELATED ART

System security is a rising challenge, especially with growing security threats and capabilities. Existing security solutions include multi-factor authentication, firewalls, anti-virus software, data encryption, information security, hardware security such as keyed logic locking and biometric authentication, and other measures. One problem with these processes is that having one device with access will allow a bad actor access to the secure system. Hackers are still able to access a secured system through different hacking methods.

It may be appreciated that a need for addressing rising security challenges to prevent unauthorized access to a secure system using an additional layer of protection is arisen.

SUMMARY OF THE INVENTION

A method is disclosed. The method includes defining a key sequence for access to a secure system. The key sequence corresponds to at least two devices coupled to the secure system to exchange data. The method also includes performing a sequence of steps corresponding to the secure system involving the at least two devices. Each step includes capturing a key from a device of the at least two devices. Each step also includes receiving the key at the secure system. The method also includes determining a sequence order for the sequence of steps based on the captured keys. The method also includes determining whether to allow access to the secure system based on whether the sequence order corresponds to the key sequence.

A method is disclosed. The method includes defining a key sequence for access to a secure device. The key sequence corresponds to at least two security gateways configured to provide data to the secure device. The method also includes, for each security gateway of the at least two gateways, providing a key from a security gateway of the at least two security gateways to the secure device. The method also includes determining a sequence order based on the captured keys. The method also includes determining whether to allow access to the secure device based on whether the sequence order corresponds to the key sequence.

A secure system includes a processor and memory coupled to the processor. The memory stores instructions that, when executed on the processor, configures the secure system to define a key sequence for access to the secure system. The key sequence corresponds to at least two devices coupled to the secure system to exchange data. The instructions also configure the secure system to perform a sequence of steps corresponding to the secure system involving the at least two devices. Each step configures the secure system to capture a key from a device of the at least two devices and receive the key at the secure system. The instructions also configure the secure system to determine a sequence order for the sequence of steps based on the captured keys. The instructions also configure the secure system to determine whether to allow access to the secure system based on whether the sequence order corresponds to the key sequence.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining with the scope of the disclosed embodiments.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and which some features may be exaggerated, and some features may be omitted or may be represented schematically in the interest of clarity. Like reference numerals in the drawings may represent and refer to the same or similar element, feature, or function. In the drawings.

DETAILED DESCRIPTION OF THE PREFERRED EMBODIMENTS

Figure 1:
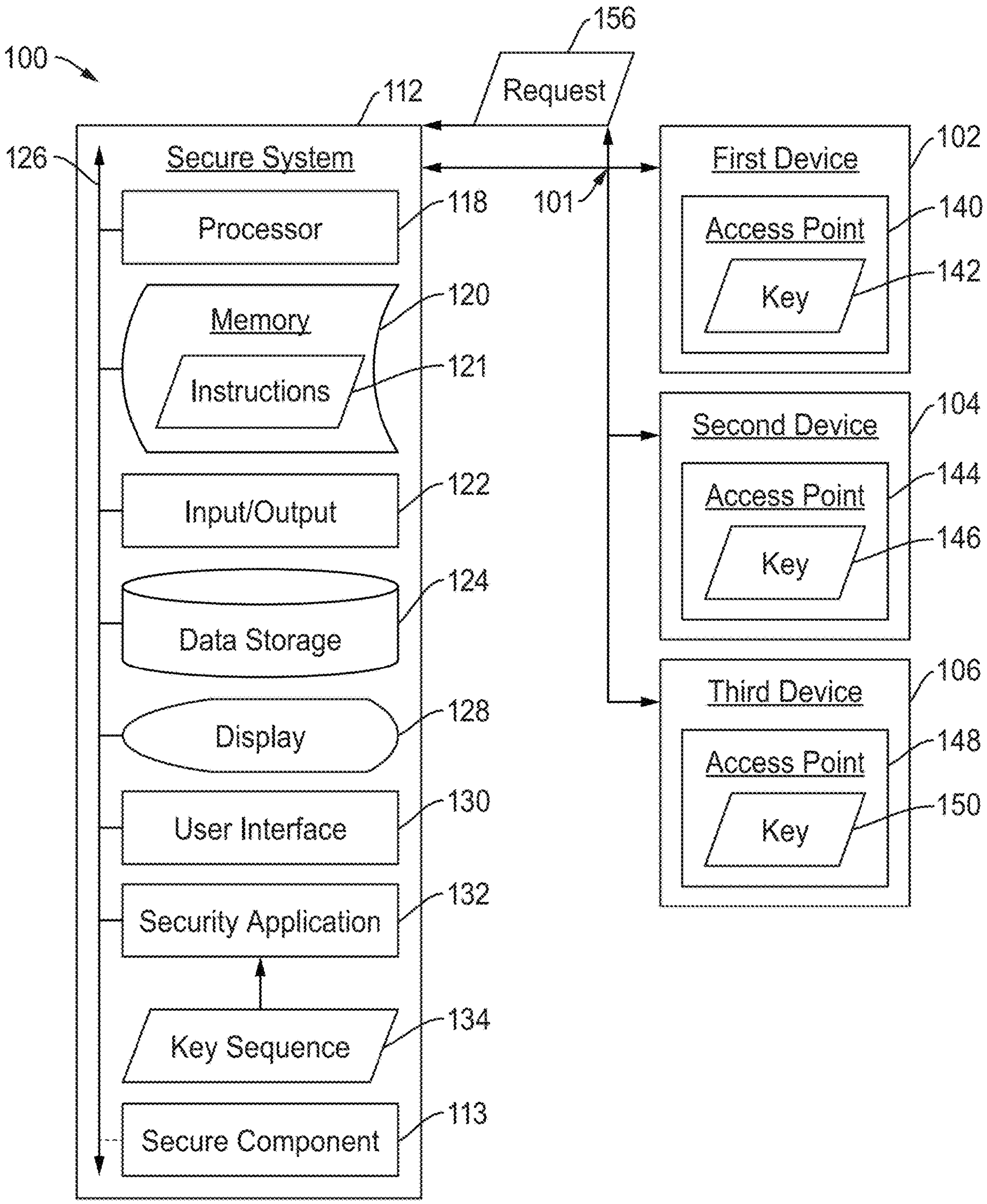
FIG. 1 illustrates a block diagram of a system having a plurality of devices and a secure system according to the disclosed embodiments.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of the embodiments of the inventive concepts, numerous specific details are set forth in order to provide a more thorough understanding of the inventive concepts. It will be apparent to one skilled in the art, however, having the benefit of the instant disclosure that the inventive concepts disclosed herein may be practiced without these specific details.

As used herein, a letter following a reference numeral is intended to reference an embodiment of the feature or element that may be similar, but not necessarily identical, to a previously described element or feature bearing the same reference numeral, such as 1, 1*a*, or 1*b*. Such shorthand notations are used for purposes of convenience only, and should not be construed to limit the inventive concepts disclosed herein in any way unless expressly stated to the contrary.

Moreover, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes plural unless it is obvious that it is meant otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

As used herein, any reference to "one embodiment," "alternative embodiments," or "some embodiments" means that particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features that may not necessarily be expressly described or inherently present in the instant disclosure.

The inventive concepts may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Inventive concepts may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed below.

With the shift towards an increasing amount of technology and data, the vulnerability of a secure system is at greater risk. The disclosed embodiments address the rising security challenges of keeping unauthorized access from a secure system. This feature may be implemented using hardware and software capabilities through sequencing. Although there are multiple ways to secure a system, the disclosed embodiments attack the issue of unauthorized access by bringing security into the pathway to address growing security threats and risks.

Rather than an addition of a secured entryway or access point, the disclosed embodiments focus on the integration of sequencing through existing secure methodologies before accessing a secure system. The disclosed embodiments enable integration of sequencing through existing secure gateways. The process of sequencing may be conducted through multiple secure gateways, such as keyed hardware, software, firmware, or network security, to safeguard a device. An owner or administrator of the secure system will have the ability to setup a startup sequence for entry into the secure system. The startup sequence is a pattern that may be configured for repeated usage or, alternatively, for a temporary period.

The disclosed embodiments employ at least three access points to the secure system. A user will have access to enter their key, password, code, and the like to any of the platforms providing the access points. Only one set of entry methods is recognized as the correct sequential order of entry into the secure system. Using the correct sequence, the secure system is unlocked, provided that each entry methods is permissible.

Use of a three-tier startup provides at least six possible ways to access the secure system without repetition. The order may be efficient for known users and undetectable by unauthorized users. Thus, the disclosed embodiments address the need for protection against unknown end-users or entities. Further, the startup sequence for accessing the secure system is customizable based on the vulnerability of the platforms, devices, or system.

FIG. 1 depicts a block diagram for a system 100 having a plurality of devices and a secure system 112 according to the disclosed embodiments. Secure system 112 may be a system or device having hardware, software, and firmware components. Secure system 112 communicates over network 101 with first device 102, second device 104, and third device 106. Additional devices may be connected to network 101 within system 100.

Secure system 112 may be a system or device that prevents access to its internal components, software, or functionality until the requestor is authenticated. In some instances, secure system 112 may include a secure component, or a secure application, 113. As disclosed below, instances of a secure component also may refer to a secure application. Secure component 113 may be a piece of hardware, such as a circuit board, chip, device, sensor, and the like, that is within secure system 112 and used to provide a functionality or capability. Secure component 113 also may be a software program, computer code, data, a data storage device, a database, or its own secure system. One may seek access to secure component 113 to enable its functionality, review its information, or modify its operation or data. Secure system 112 does not allow this action to happen until requested access is authenticated according to the secure pattern within disclosed embodiments.

Secure system 112 also includes other components and functionality. For example, secure system 112 may include at least one processor 118, a memory 120 having instructions 121, and an input/output (I/O) subsystem 122. These components of secure system 112 may be connected to each other with data bus 126. Processor 118 may execute instructions 121 stored in memory 120 to configure secure system 112 to perform the functions and operations disclosed herein, including the operations of authentication access to secure component 113. Further, instructions 121 may configure secure system 112 to exchange data with first device 102, second device 104, and third device 106.

I/O subsystem 122 may include an I/O controller, a memory controller, and one or more I/O ports. Processor 118 and I/O subsystem 122 are communicatively coupled to memory 120 via data bus 126. Memory 120 may be embodied as any type of computer memory device, such as a random access memory. Memory 120 also may be a non-volatile memory storing instructions 121. I/O subsystem 122 also may be communicatively coupled via data bus 126 to a number of hardware, firmware, or software components, including a data storage device 124, a display device 128, and a user interface (UI) subsystem 130.

Data storage device 124 may include one or more hard drives or other suitable persistent storage devices, such as flash memory, memory cards, memory sticks, and the like. A database to enable authentication operation by secure system 112 may reside at least temporarily in data storage device 124. Processing according to the disclosed embodiments also may occur within secure system 112. The operations to execute these processes is disclosed in greater detail below.

The disclosed embodiments implement an alternating sequence of a minimum of three or more security steps for a user to gain access to secure system 112. A sequence of these security steps must be followed to access secure system 112 or secure component 113. Secure system 112 includes a startup order stored in memory 120 to enter secure keys into a gateway, or security application 132, at the secure system. The startup order includes a defined or set order in which security codes, keys, data, or other information related to authentication is received from devices connected to secure system 112 over network 101. The order for starting secure system 112 will be the security sequence as captured by secure connected devices.

Key sequence 134 is the sequential order that one would follow to enter secure system 112. This sequential order includes any number of unique methods to enter a system, where only one of them is the accurate method recognized by memory 120. The sequential order may act as a password for accessing secure system 112. Examples of key sequences are disclosed below.

Key sequence 134 may be generated by the owner, developer, builder, and the like of secure system 112. Key sequence 134 is shared with permitted users. These users will have the knowledge of the sequence of steps to match the correct sequence. Security application 132 may capture the responses from the connected devices and determine whether the received sequence of providing the information matches key sequence 134. If so, then secure system 112 may startup or allow access to one of the connected devices. In some embodiments, a match of received information with key sequence 134 may allow the user to remove or use secure component 113.

The disclosed embodiments include steps that the user take to enter into secure system 112. These steps may be an access point that the user enters a password or captures other forms of authentication. These steps may include password-based log ins, hardware key, biometric authentication, token-based authentication, single sign on authentication, and the like. The sequence of these steps is compared to key sequence 134 to verify the user to secure system 112. The sequence acts as the password being entered by the user to secure system 112.

As disclosed above, authentication may occur using different processes. Authentication may be the process to identify users that request access to a secure system, network, server, application, website, or device. In the disclosed embodiments, this feature may be shown as secure system 112. The different processes to authenticate may include digital, hardware, network (internet), or biometric, or a combination thereof.

One type of authentication may be a password-based login for an information platform. This type may be something to secure information that is not necessarily connected to a network. Another type of authentication may be a single sign on authentication for a network platform. This type may be something via the internet. Another type of authentication may be token based authentication using a hardware token. The hardware token may be used on hardware platform or a digital platform via the internet.

A hardware key also may be used for authentication. The hardware key may include a physical key, a circuit card, a universal serial bus (USB) device, and the like. Biometric authentication also may be used for authentication. Biometric authentication may be performed using one or more fingerprints, voice, face, retina and iris, and the like.

Any authentication method that is dependent on another may be used if the methods are considered a single key. These methods may involve device authentication, multi-factor authentication, duo factor authentication, or an one time passcode.

The devices are connected to secure system 112 over network 101. Network 101 may be a cloud-based platform that allows communication between the devices and secure system 112 without a wired or direct connection. Alternatively, network 101 may be a cellular network, a wide area network, a local area network, a Bluetooth™ network, and the like. In other embodiments, the devices include the functionality to send data to each other wirelessly.

If a user wants to connect, startup, or access secure system 112, then the user may send a request 101 to secure system 112 to enable communication of information provided in a sequence. Secure system 112 may react to request 156 by invoking security application 132 to retrieve key sequence 134. Key sequence 134 may be stored in data storage 124 or memory 120. In some embodiments, the owner or administrator of secure system 112 may modify or update key sequence 134.

Each device includes an interface, or access point, that allows a user to input data as a key. Alternatively, a device may include keyed logic to provide input data. For example, first device 102 may include a key that is provided to secure system 112 through access point 140. Key 142 may be a hardware key. Access point 140 may be a universal serial bus (USB) port or the like. To provide key 142, the user may insert access point 140 into secure system 112 to transmit key 142 to secure system 112.

Second device 104 may be a computer or computing device that provides a software passcode as key 146 to secure system 112. Second device 104 may include access point 144, which may be a graphical user interface that allows the user to enter the password or passcode for key 146. Alternatively, second device 104 may include its own key, such as an application programming interface (API) key, that is provided to secure system 112 using an access point 144 using a connection over network 101.

Third device 106 may be a handheld device, such as a smartphone or tablet, that runs an application over the network to allow the user to input a code, or key 150, into the application, which serves as access point 148. It may be appreciated that these examples of devices 102, 104, and 106 are not limited to the disclosure here. The devices should be active at all times to capture a key using an interface, or access point, to secure system 112.

In some embodiments, the length of the key sequence, or the number of steps, may corresponds to the number of devices, or entry points, from which one is able to select. The disclosed embodiments also may implement a permutation formula that determines any number of independent sequences to start or access a secure system. For three devices, the number of permutations may be 6. Thus, six different ways may be defined to access secure system 112.

The disclosed embodiments may implement the following permutation sequence equation:

$$_nP_k = \frac{n!}{(n-k)!}, \qquad \text{Equation 1}$$

where n is the size of the set, P is the permutation, and k is the number selected. Relating back to the disclosed embodiments, n may be the number of devices, and k may relate to the steps, otherwise known as length or space provided for the number of permutations.

For example, for three devices, as shown in FIG. 1 and wanting all devices involved as possible entry points, then Equation 1 would result in 3!/(3−3)!, or 6 permutations. Thus, a possible number of 6 different sequences may be used. If there are 10 devices using 5 different steps for entry points, then Equation 1 would result in 10!/(10−5)! or 30 possible permutations of the key sequence for access to the secure system. Thus, five devices may be arranged 30 different ways according to Equation 1. This feature allows the number of permutations to be reasonable for a large number of devices.

For example, security application 132 may register the devices using identification information, such as an internet protocol (IP) address, serial numbers, and the like so that it can match the incoming data to the appropriate device. During operation, key sequence 134 may specify that secure system 112 receive data from three entry points, or devices. Those devices may be first device 102, second device 104, and third device 106. These devices may be accepted by security application 132. Thus, there can be six possible combinations:

1) First device 102, second device 104, and third device 106;
2) First device 102, third device 106, and second device 104;
3) Second device 104, third device 106, and first device 102;
4) Second device 104, first device 102, and third device 106;
5) Third device 106, first device 102, and second device 104; and
6) Third device 106, second device 104, and first device 102.

Key sequence 134 may specify that the correct sequence in which to receive keys from the connected devices is combination 4 above, or second device 104, first device 102, and third device 106. Thus, the user inputs keys, passcodes, or provides this information in this order from the connected devices to gain access to secure system 112. Secure system 112 and security application should receive key 146 first, key 142 second, and key 150 third to match the sequence combination defined by key sequence 134.

If the keys are provided to secure system 112 according to one of the other combinations, then access is not granted. For example, the user may input key 150 from third device 106, key 146 from second device 104, and key 142 from first device 102, which does not match the defined sequence in key sequence 134. Secure system 112 may configured to prevent the user from attempting a second log in operation using any devices. Alternatively, the user may be asked to provide an alternate key sequence 134 with limited attempts set by the owner or developer of secure system 112. Failure to provide the keys in the proper sequence may require the owner or administrator to reset key sequence 134. The disclosed embodiments do not want to allow unauthorized users to repeatedly enter keys until the right combination is found.

In some embodiments, a timed sequence may be used. Secure system 112 may look to receive keys within a set period of time so that the user should have all devices at his or her disposal. In other words, one cannot provide key 146 to secure system 112 then provide key 142 several minutes or even hours later. The devices should be in close proximity to each other. If the timed sequence is violated, then secure system 112 may stop authentication operations, as disclosed above.

The disclosed embodiments allow the user to access secure system 112 via different security gateways that the user chooses. Secure system 112, however, only accepts the correct sequence of security steps for which key sequence 134 was originally configured. Even if the user enters the right password or the correct key for all the steps, the alternation of the input order of the steps prevents the user from accessing secure system 112. As disclosed above, the sequence of the steps of receiving data may be modified periodically by the owner or an administrator of secure system 112 based on the vulnerability of the secure system to hackers.

Key sequence 134 may be provided in a user manual or other memory associated with secure system 112. Individual security steps, or devices, are accessible for the user to input the keys. Thus, secure system 112 would not unlock or authenticate the user unless the device receives the correct sequence of steps (with the correct password at each step) that matches key sequence 134 of the steps stored in the system. For example, using the combination 4 above, if secure system 112 receives this combination, then access would be denied to secure system 112.

Figure 2:
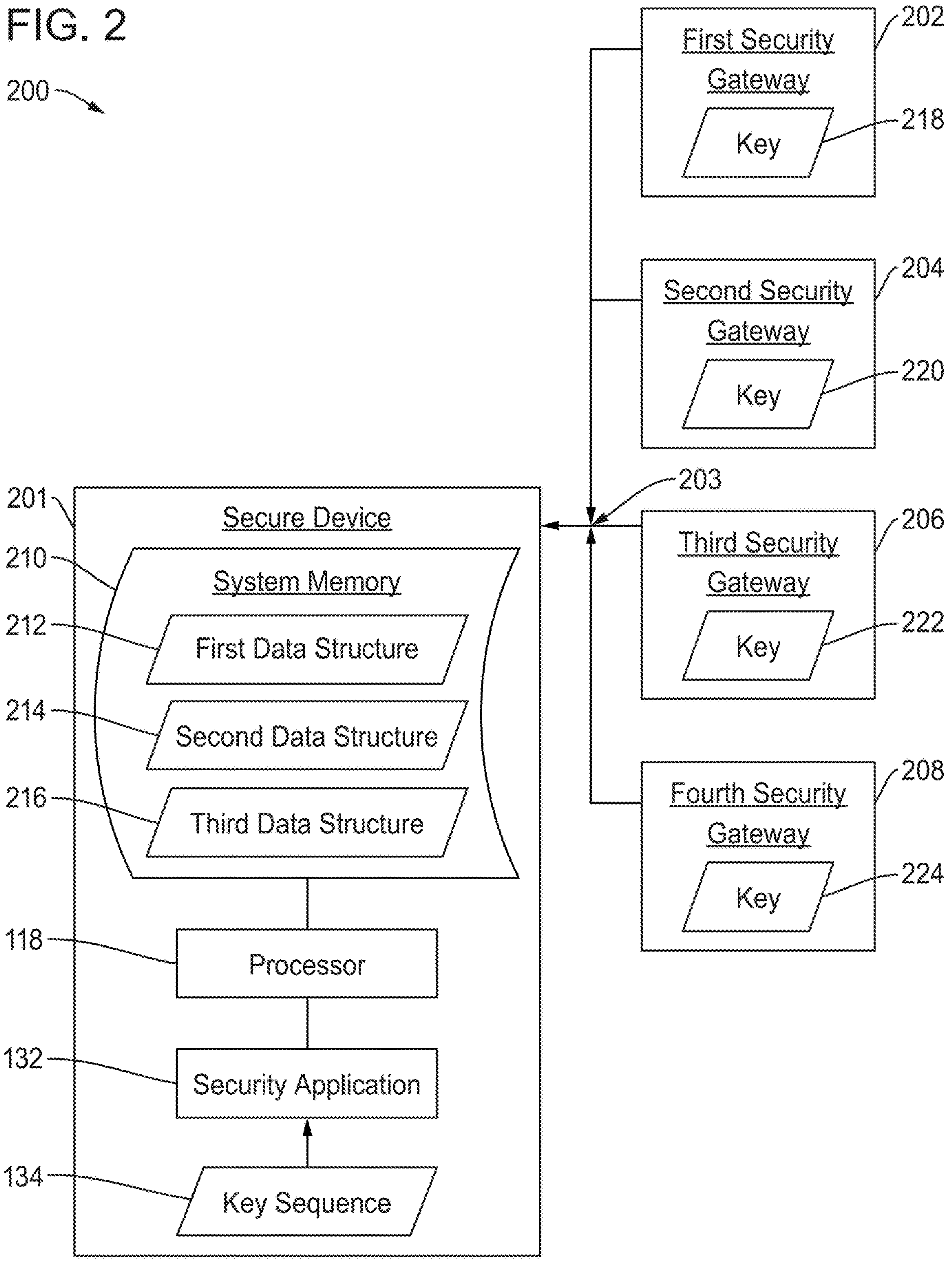
FIG. 2 illustrates a block diagram of a system having a plurality of security gateways and a secure device according to the disclosed embodiments.

FIG. 2 depicts a block diagram of a system 200 having a plurality of security gateways and a secure device 201 according to the disclosed embodiments. System 200 may be similar to system 100 disclosed above. System 200 includes secure device 201. Secure device 201 also may be a system having the components disclosed within secure system 112 but not shown here for brevity. Secure device 201 also may include system memory 210. Using entry point 203, different security gateways may seek to gain access to system memory 210 via secure device 201.

System memory 210 may include first data structure 212, second data structure 214, and third data structure 216. The data structures may pertain to data generated or collected by secure device 201. Users may access the data structures over entry point 203, which may be similar to network 101 disclosed above. In some embodiments, however, instead of devices, system 200 may enable security gateways for authenticating access to the data structures within system memory 210.

A security gateway may be an application, interface, hardware, and the like that captures a key, such as a passcode, digital key, encrypted data, keyed hardware, and the like, to provide to secure device 201 over network 103. Thus, the disclosed embodiments may have first security gateway 202, second security gateway 204, third security gateway 206, and fourth security gateway 208. The security gateways may be located on separate devices, such as first device 102, second device 104, third device 106, and fourth device 108. Alternatively, the security gateways may be located on one, two, or three devices.

For example, first device 102 may be a computer. The computer can provide two security gateways. One may be the log in interface to the computer, wherein the user types in a password. The second one may be the log in interface via network 103. Again, a code or password may be provided at the network access interface, which is the second security gateway provided at the computer, or first device 102.

For example, first security gateway 202 may be the interface that captures a general system password at a device. Key 218 may be the general system password. Second security gateway 204 may be the interface to enter a biometric authentication, such as using a face or eye, at the device. The biometric authentication differs from the general system password. Key 220 may represent the biometric authentication.

Third security gateway 206 may be an interface to authenticate entry via entry point 203. For example, a password may be provided to access entry point 203. The password may be used for key 222. Fourth security gateway 208 may be an input from keyed hardware, such as a USB device coupled to a port at first device 102. Using keys 218, 220, 222, and 224, secure device 201 may implement a total of 24 possible security sequences that the user can take to access the secure device.

As disclosed above, key sequence 134 may define the sequence of inputting the information for keys 218, 220, 222, and 224 on entry point 203 to obtain access to secure device 201. Security application 132 may receive the keys in the order they are presented to secure device 201. If the sequence order matches key sequence 134, then the user is authenticated to access secure device 201.

For example, key sequence 134 may specify that the correct sequence of steps to access system memory 210 is fourth security gateway 208, first security gateway 202, second security gateway 204, and third security gateway 206. Keys, passcodes, or other authentication information should be received from the security gateways in this order. Further, a timed interval may be defined between receiving keys from second security gateway 204 and third security gateway 206. For example, the timed interval may be 90 seconds. Thus, the user has 90 seconds to provide key 222 through security gateway 206 after key 220 has been received. Otherwise, even if the correct sequence is followed for providing keys from the security gateways, access to system memory 210 is denied by security application 132. Secure device 201 and security application 132 may not allow any further access to system memory 210 until the unauthorized access is addressed.

Figure 3:
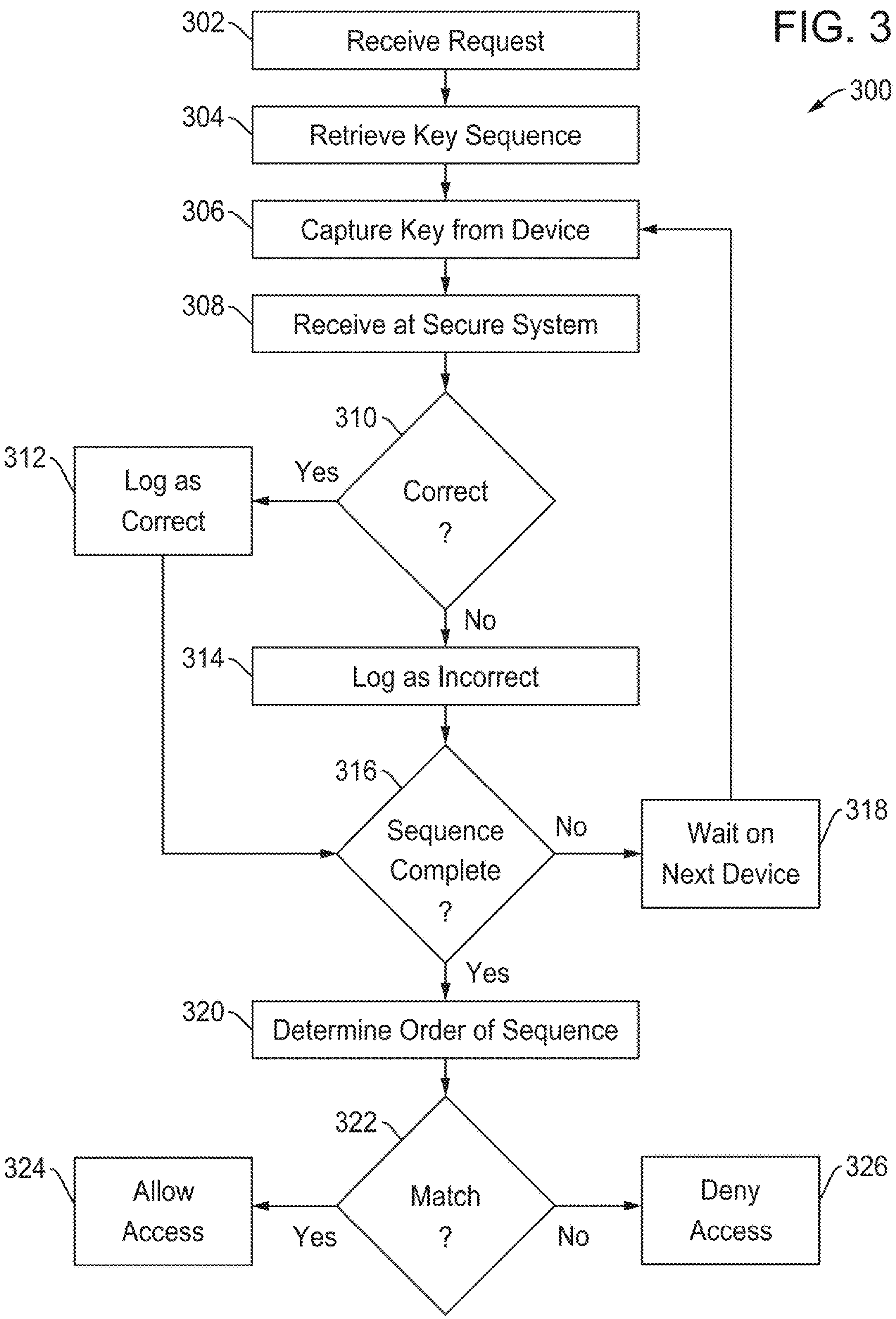
FIG. 3 illustrates a flowchart for using a sequence of security switching to access a secure system according to the disclosed embodiments.

FIG. 3 depicts a flowchart 300 for using a sequence of security switching to access secure system 112 according to the disclosed embodiments. Flowchart 300 may refer to FIGS. 1 and 2 for illustrative purposes. Flowchart 300, however, is not limited to the embodiments disclosed in FIGS. 1 and 2.

Step 302 executes by receiving a request 156 at secure system 112 for authentication and access by a user. These devices may capture and provide keys, as defined above, to access secure system 112. Step 304 executes by retrieving key sequence 134 for authentication by security application 132. Key sequence 134 may define the sequence to be determined to allow access to secure system 112.

Step 306 executes by capturing a key from a device, such as first device 102, second device 104, third device 106, or fourth device 108. As disclosed above, the key may be captured or inputted at an access point on the device. Thus, access point 140 captures key 142 at first device 102, access point 144 captures key 146 at second device 104, access point 148 captures key 150 at third device 106, and access point 152 captures key 154 at fourth device 108.

Step 308 executes by receiving the key at secure system 112 from the corresponding device. For example, key 142 may be provided by first device 102 to secure system 112. Security application 132 may store the received key as well as an identification of the sending device, such as its IP address, serial number, and the like. Step 310 executes by determining whether the received key is correct. In other words, does the key match what is defined by key sequence 134. Each key may be a type of input, as disclosed above. The input is compared to what is defined by key sequence 134 to see if it matches. If yes, then step 312 executes by logging the received key as correct. If step 310 is no, then step 314 executes by logging that the received key is incorrect. These determinations are not made available to the user. Flowchart 300 then proceeds to step 316.

Step 316 executes by determining whether the sequence is complete for authentication by security application 132. Secure system 112 determines whether it should expect any further keys or information from devices connected to it. For example, key sequence 134 may define that a sequence using three devices should be expected. Security application 132 may check to see if the recently received key is the last step in the sequence.

If step 316 is no, then step 318 executes by waiting on the next or other devices connected to secure system 112. Alternatively, secure system 112 may send a notification to the user on the device that recently provided a key that the user may proceed to the next device to capture the respective key. The notification may be provided by secure system 112 or other means. Flowchart 300 then proceeds back to step 306 to perform the next step in the sequence.

If step 316 is yes, then step 320 executes by determining the order of the sequence of keys received from the corresponding devices. For example, the order may be second device 104, first device 102, and third device 106. Security application 132 may determine the order.

Step 322 executes by determining whether the determined order of the sequence of received keys matches key sequence 134. For example, the order that the devices provided keys to security application 132 is compared against the defined order for access to secure system 112 in key sequence 134. If step 322 is yes, then step 324 executes by allowing access to secure system 112. Secure system 112 authenticates the user and allows access to the secure system. If step 322 is no, then step 326 executes by denying access to secure system 112.

Figure 4:
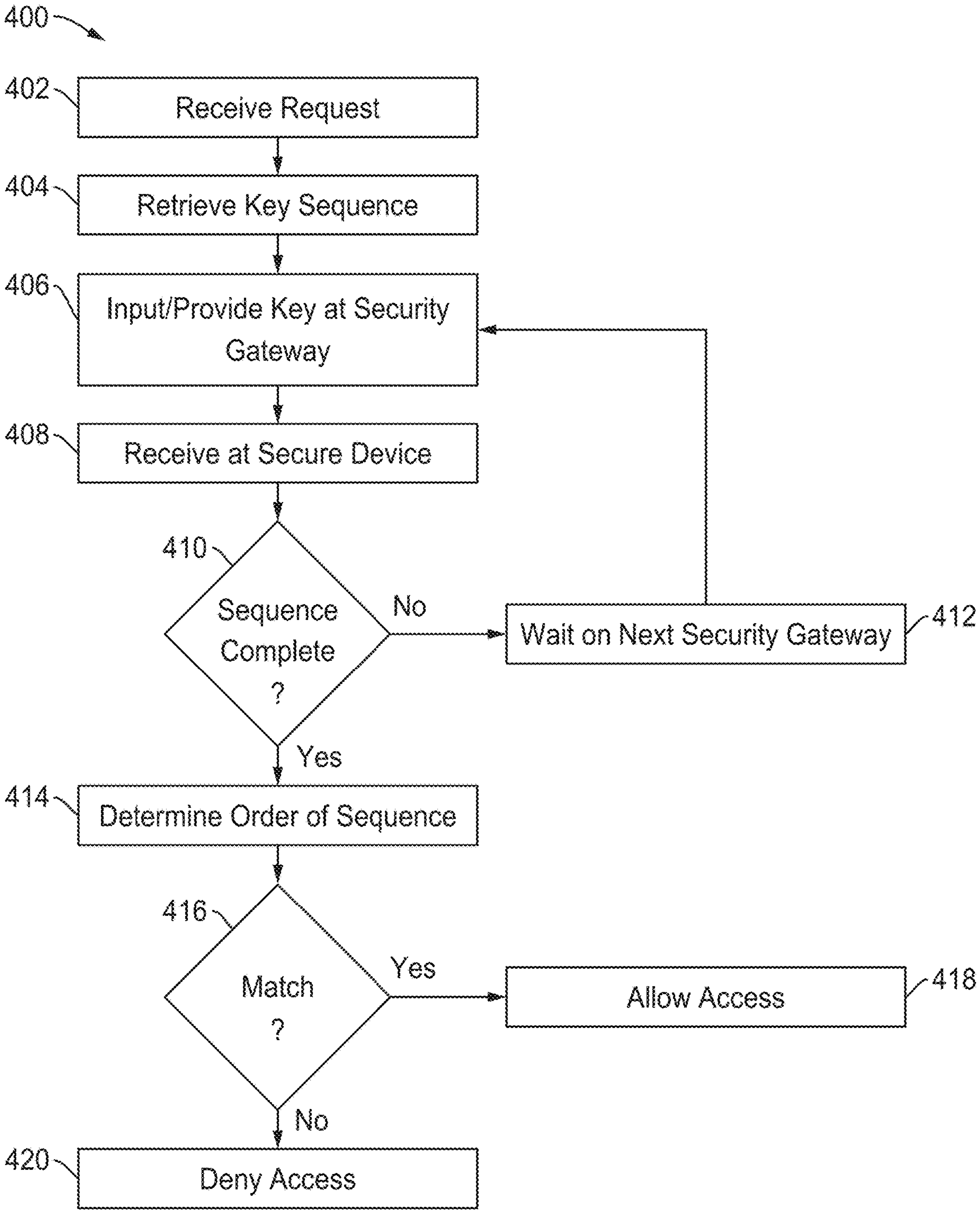
FIG. 4 illustrates a flowchart for using a sequence of security switching to access a secure device according to the disclosed embodiments.

FIG. 4 depicts a flowchart 400 for using a sequence of security switching to access secure device 201 according to the disclosed embodiments. In some embodiments, access may be to system memory 210. Flowchart 400 may refer to FIGS. 1-3 for illustrative purposes. Flowchart 400, however, is not limited to the embodiments disclosed in FIGS. 1-3.

Step 402 executes by receiving a request 156 at secure device 201 for authentication and access by a user, such as to access system memory 210. The user corresponds to specific security gateways defined for use in system 200. As disclosed above, more than one security gateway may be on a device. The user provides input to the security gateways or provides data from the device through the gateways to secure device 201. Step 404 executes by retrieving key sequence 134 for authentication by security application 132. Key sequence 134 may define the sequence to be determined to allow access to secure device 201.

Step 406 executes by inputting or providing a key at a security gateway, such as first security gateway 202, second security gateway 204, third security gateway 206, or fourth security gateway 208. As disclosed above, the key may be input at the security gateway or data at the security gateway, like a keyed logic circuit. Thus, first security gateway 202 inputs or provides key 218, second security gateway 204 inputs or provides key 220, third security gateway 206 inputs or provides key 222, and fourth security gateway 208 provides key 224.

Step 408 executes by receiving the key at secure device 201 from the corresponding security gateway. For example, key 218 may be provided by first security gateway 202 to secure device 201. Security application 132 may store the received key as well as an identification of the sending security gateway, such as its IP address, serial number, and the like. Step 410 executes by determining whether the sequence is complete for authentication by security application 132. Secure system 112 determines whether it should expect any further keys or information from the security gateways. For example, key sequence 134 may define that a sequence using four security gateways should be expected. Security application 132 may check to see if the recently received key is the last step in the sequence.

If step 410 is no, then step 412 executes by waiting on the next or other security gateways connected to secure device 201. Alternatively, secure device 201 may send a notification to the user on the device that hosts the security gateway that recently provided a key that the user may proceed to the next security gateway to input or provide the respective key. The notification may be provided by secure device 201 or other means. Flowchart 400 then proceeds back to step 406 to perform the next step in the sequence.

If step 410 is yes, then step 414 executes by determining the order of the sequence of keys received from the corresponding security gateways. For example, the order may be fourth security gateway 208, first security gateway 202, second security gateway 204, and third security gateway 206. Further, any timed interval may be determined by security application 132. Security application 132 may determine the order and the time values for any timed intervals.

Step 416 executes by determining whether the determined order of the sequence of received keys matches key sequence 134. For example, the order that the devices provided keys to security application 132 is compared against the defined order for access to secure device 201 in key sequence 134. If step 416 is yes, then step 418 executes by allowing access to secure device 201. Secure device 201 authenticates the user and allows access to system memory 210. If step 416 is no, then step 420 executes by denying access to secure device 201.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A method comprising:

defining a key sequence for access to a secure system, wherein the key sequence corresponds to at least two devices coupled to the secure system to exchange data;

performing a sequence of steps corresponding to the secure system involving the at least two devices, wherein each step includes capturing a key from a device of the at least two devices;

receiving the key at the secure system;

determining a correctness of each step;

restricting an availability of the correctness of each step such that the correctness of each step is unavailable to the device of the at least two devices;

determining a sequence order for the sequence of steps based on the captured keys; and determining whether to allow access to the secure system based on whether the sequence order corresponds to the key sequence.

2. The method of claim 1, wherein each key includes a first type of input.

3. The method of claim 2, wherein the first type of input differs from a second type of input for a different key.

4. The method of claim 1, wherein the determining whether to allow access includes allowing access to the secure system.

5. The method of claim 1, wherein the determining whether to allow access includes denying access to the secure system.

6. The method of claim 1, wherein determining whether to allow access includes allowing access to a secure component in the secure system.

7. The method of claim 1, wherein the secure system is a secure device.

8. The method of claim 1, further comprising determining whether the key is received within a timed interval.

9. A method comprising:

defining a key sequence for access to a secure device, wherein the key sequence corresponds to at least two security gateways configured to provide data to the secure device;

for each security gateway of the at least two security gateways, providing a key from a security gateway of the at least two security gateways to the secure device;

for each security gateway of the at least two security gateways, determining a correctness of the key;

restricting an availability of the correctness of each key;

determining a sequence order based on the captured keys; and determining whether to allow access to the secure device based on whether the sequence order corresponds to the key sequence.

10. The method of claim 9, wherein the secure device includes a system memory.

11. The method of claim 10, wherein determining whether to allow access includes determining whether to allow access to the system memory based on whether the sequence order corresponds to the key sequence.

12. The method of claim 9, wherein the key is a password.

13. The method of claim 9, wherein the key is a code.

14. The method of claim 9, wherein the key is an input from keyed hardware.

15. The method of claim 9, wherein the determining whether to allow access includes allowing access to the secure device.

16. The method of claim 9, wherein the determining whether to allow access includes denying access to the secure device.

17. The method of claim 9, further comprising determining whether the key is provided within a timed interval.

18. A secure system comprising a processor and a memory coupled to the processor, wherein the memory stores instructions that, when executed on the processor, configures the secure system to define a key sequence for access to the secure system, wherein the key sequence corresponds to at least two devices coupled to the secure system to exchange data;

perform a sequence of steps corresponding to the secure system involving the at least two devices, wherein each step configures the secure system to;

capture a key from a device of the at least two devices;

receive the key at the secure system; and determine a correctness of the key;

restrict an availability of the correctness of each key such that the correctness of each key is unavailable to the device of the at least two devices;

determine a sequence order for the sequence of steps based on the captured keys; and determine whether to allow access to the secure system based on whether the sequence order corresponds to the key sequence.

19. The secure system of claim 18, wherein the secure system is further configured to allow access to a secure component in the secure system.

20. The secure system of claim 18, wherein the secure system is a secure device.

* * * * *